United States Patent [19]
Hehn

[11] Patent Number: 5,201,278
[45] Date of Patent: Apr. 13, 1993

[54] BIRD AND SMALL ANIMAL CAGE APRON

[76] Inventor: Bruce A. Hehn, 9570 Pondera St., N.W., Massillon, Ohio 44646

[21] Appl. No.: 890,765

[22] Filed: Jun. 1, 1992

[51] Int. Cl.[5] ............................................. A01K 31/06
[52] U.S. Cl. ........................................ 119/17; 119/21
[58] Field of Search .................... 119/17, 18, 21, 23, 119/26, 19

[56] References Cited

U.S. PATENT DOCUMENTS

| | | | |
|---|---|---|---|
| 1,460,102 | 6/1923 | Leon | 119/17 |
| 4,991,544 | 2/1991 | Galvin et al. | 119/17 |

FOREIGN PATENT DOCUMENTS 241598  4/1911  Fed. Rep. of Germany ........ 119/17

Primary Examiner—John G. Weiss
Attorney, Agent, or Firm—Michael Sand Co.

[57] ABSTRACT

A cage apron adapted for use with a wire cage for redirecting debris scattered from within the cage by an enclosed animal back into the cage. The apron has at least one locking member having equally spaced locking tabs extending the length thereof and at least one ratchet member having equally spaced crenations extending the length thereof which is ratcheted along the locking tabs of the locking member for telescopically joining the members into a frame like structure for mounting on the cage. Each of the members is formed with a flanged edge and an opposite support edge. The flanged edges of the two members align with each other into a locked relationship when the two members are telescopically joined. A plurality of removable tabs extend outwardly from the support edge of the ratchet member for extending through the cage bars. A plurality of serrations are formed on the ratchet member for separating the ratchet member into a desired length to match the length of the cage.

19 Claims, 5 Drawing Sheets

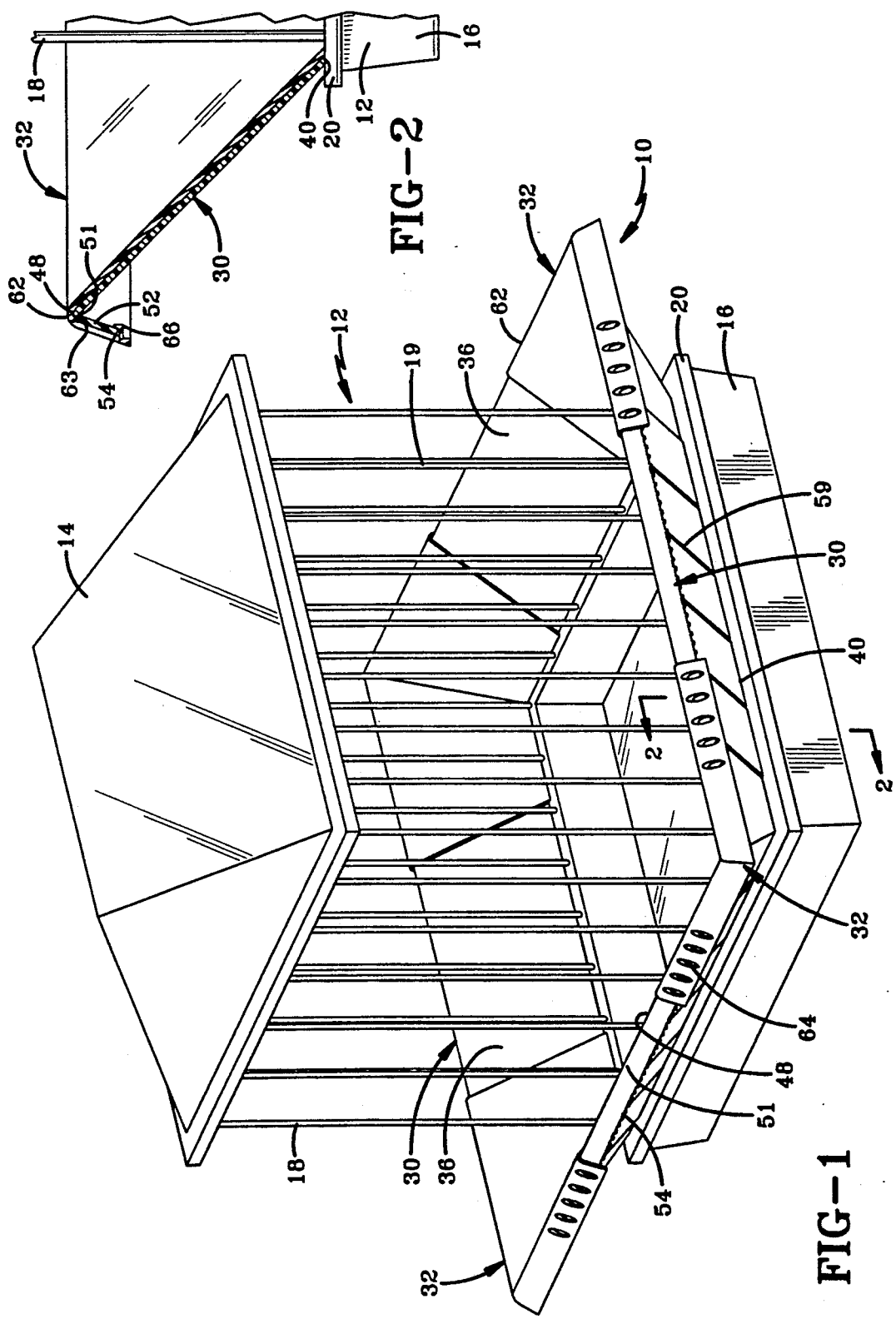

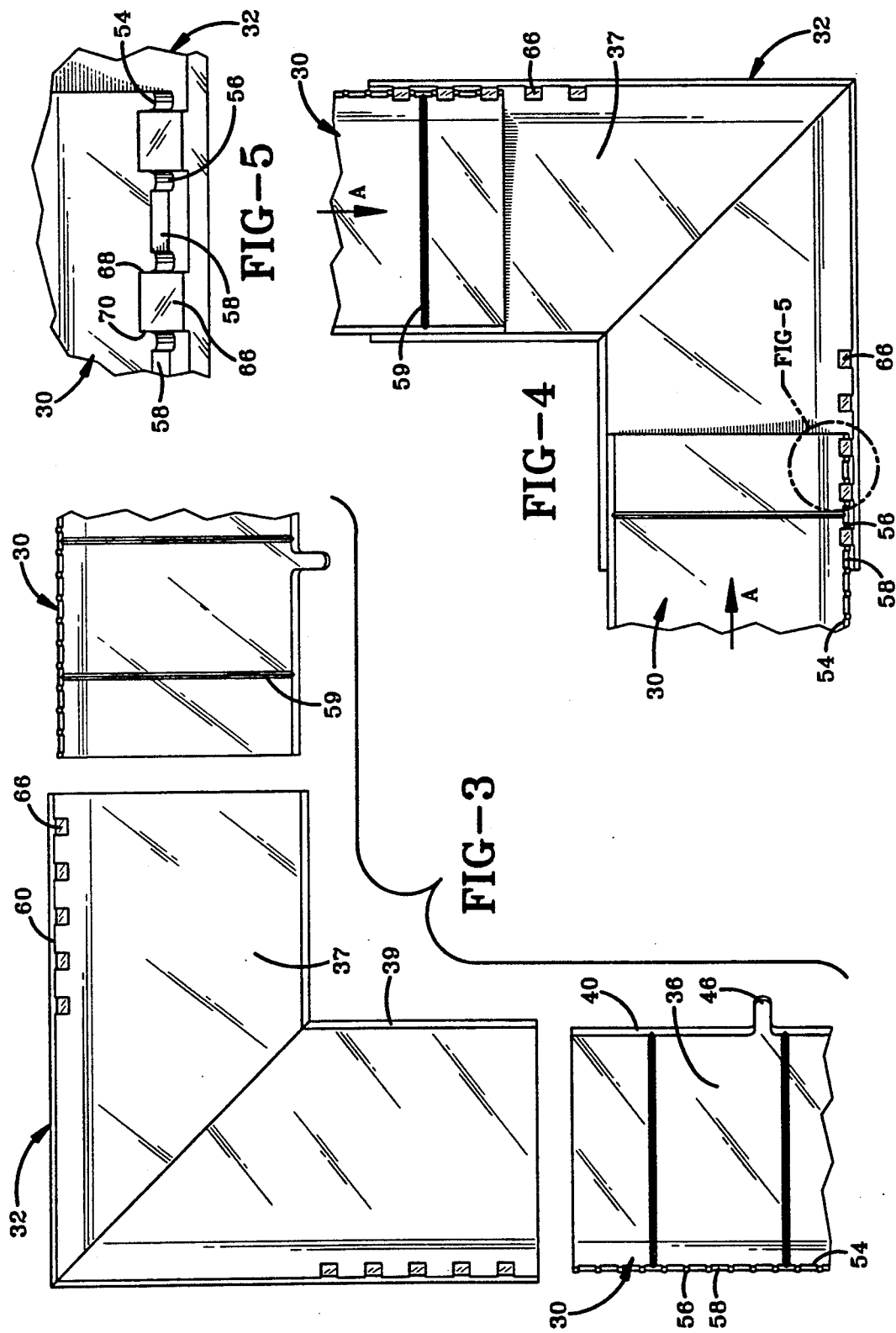

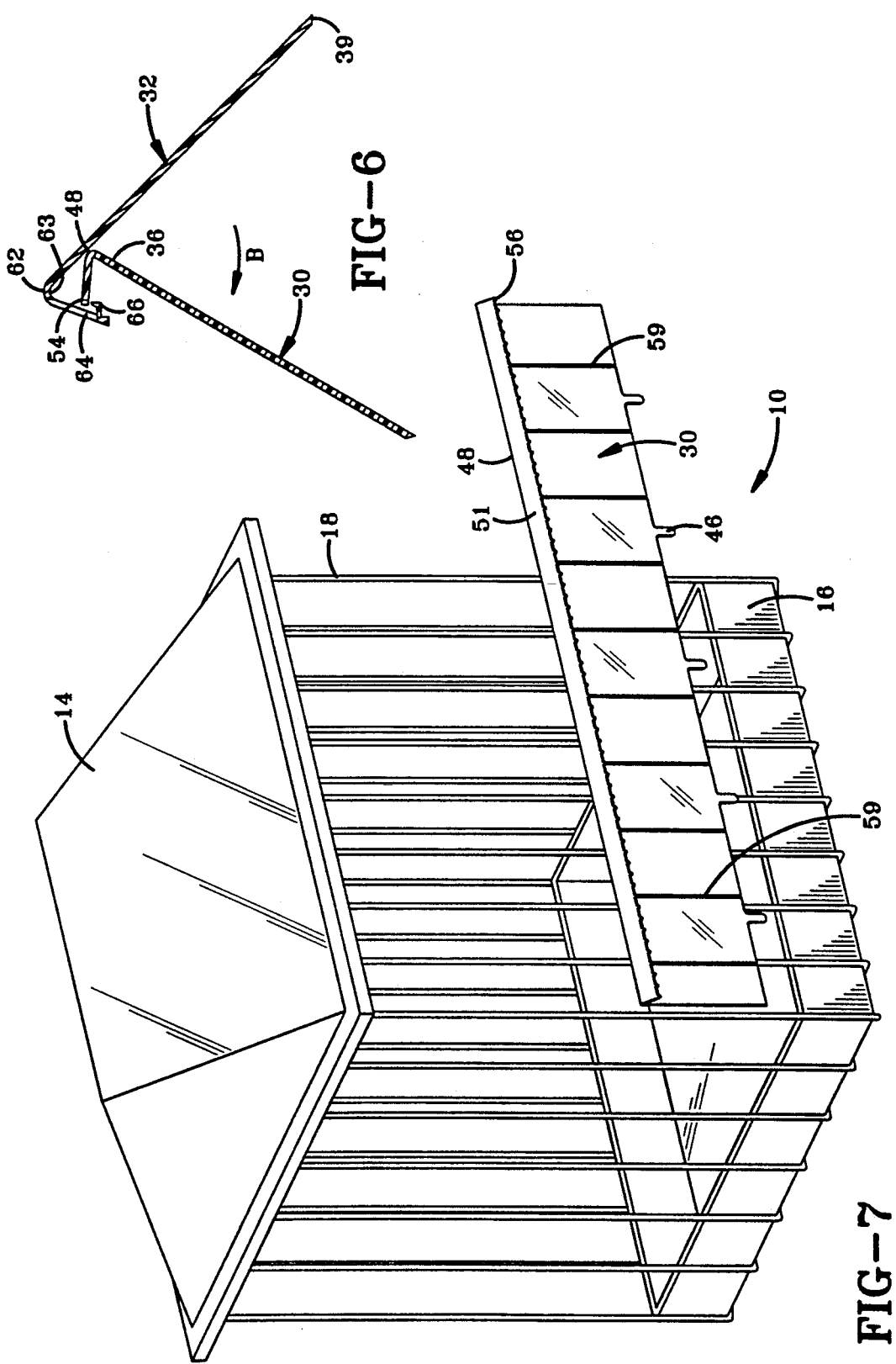

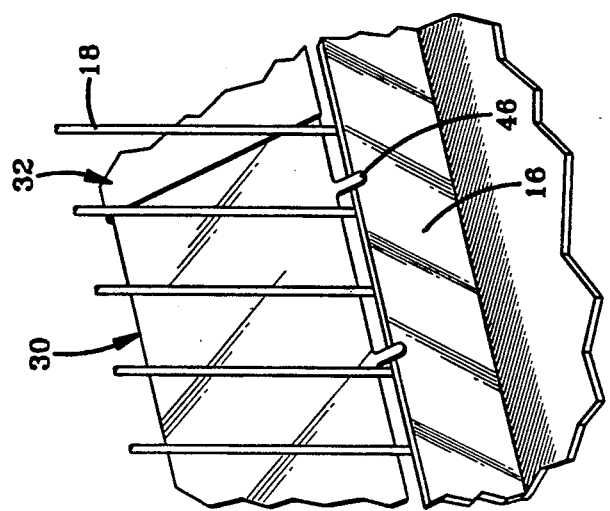
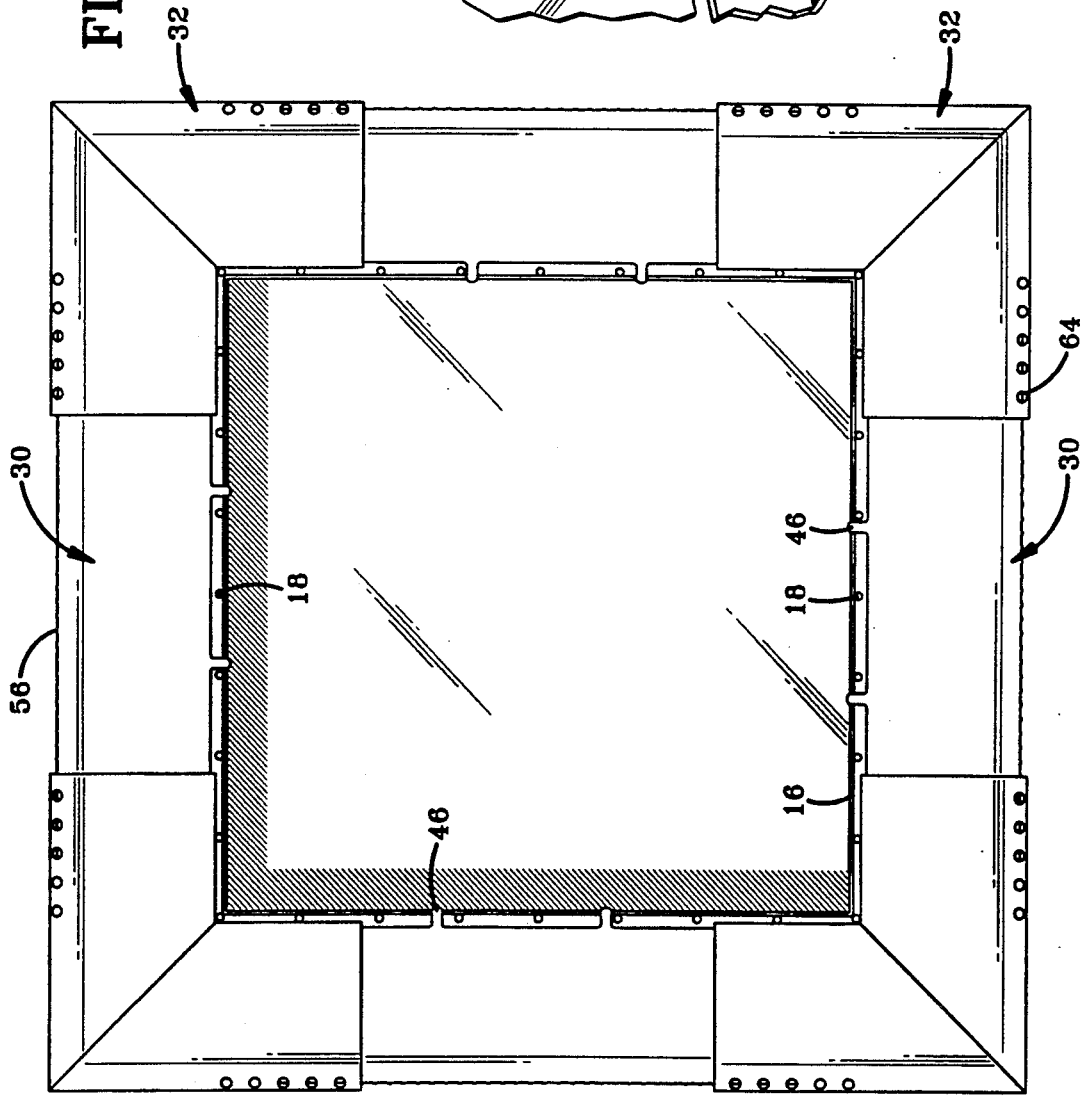

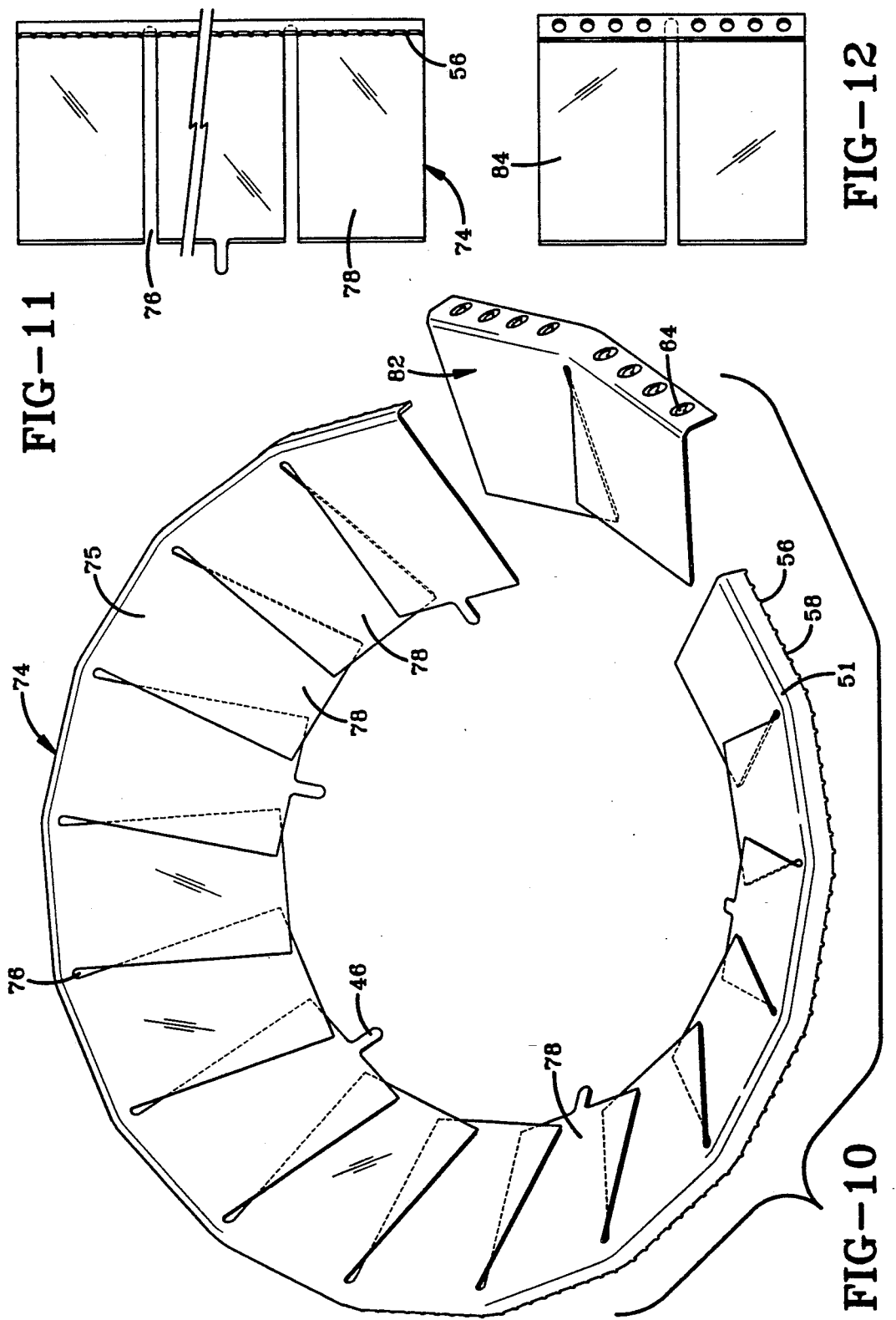

BIRD AND SMALL ANIMAL CAGE APRON

BACKGROUND OF THE INVENTION

1. Technical Field

The present invention relates to cages for birds and small animals. More particularly, the invention relates to an apron which fits around the cage to prevent debris within the cage from falling onto the floor. Specifically, the invention relates to a cage apron which may be affixed to cages having a variety of sizes and shapes, and which is easily removed for cleaning.

2. Background Information

In recent years, birds and small animals have become quite popular as pets. Generally, the pets are housed in a wire mesh cage that can range from ten inches square, to cages having four to five foot sides. Moreover, these cages come in a variety of shapes, including round, rectangular, etc. These cages are employed as they are quite affordable, and can be manufactured to be both aesthetically pleasing and functional.

One problem associated with the use of these wire cages is that the enclosed animal has a tendency to scatter debris outside the perimeter of the cage. The floor area directly around the cage then becomes littered with food particles, bedding chips and other debris from inside the cage.

While certain cage skirts have been developed in the art which are presumably adequate for the purpose for which they are intended, the prior art skirts do not provide all the advantages and features of the present invention. Specifically, they can be bulky, and difficult to install. Moreover, the skirts are often manufactured for a specific size cage requiring a manufacture to make, and a retailer to stock, a different skirt for each size and shape cage which is sold.

Thus, despite the increased popularity of keeping small animals as pets, no apron has yet been developed to my knowledge where a single unit may be easily affixed to a variety of cages having different shapes and sizes.

SUMMARY OF THE INVENTION

Objectives of the present invention include providing an apron to redirect debris that has been scattered through the sides of a wire cage, back into the cage thereby preventing the debris from falling onto the floor surrounding the cage.

Another objective is to provide such an apron which is supported from the cage thereby requiring no mounting hardware, and which is molded of plastic and is snap-fitted together to form the desired shape and size.

A further objective of the present invention is to provide such an apron as set forth above, which may be fitted to cages having a variety of sizes and shapes thereby reducing the number of specialty pieces which are manufactured, and stocked by the retailer.

A still further objective of the present invention is to provide such an apron which can be easily installed, and repeatedly removed to afford the purchaser the opportunity to clean the apron.

Another objective of the present invention is to provide such an apron which can be installed with a minimum of effort, to both cages having a lower ledge extending from the cage bottom, and cages where no lower ledge is provided.

A still further objective is to provide such an apron which is of a simple construction, which achieves the stated objectives in a simple, effective and inexpensive manner, and which solves problems and which satisfies needs existing in the art.

These and other objectives and advantages of the invention are obtained by the improved cage apron of the invention, the general nature of which may be stated as comprising at least one locking member having spaced locking tabs extending along a portion of the length thereof; and at least one ratchet member having spaced crenations extending along a portion of the length thereof adapted to engage said locking tabs when said ratchet member is telescopically ratcheted along said locking member to form a circumambient apron adapted to be supported from said cage in an outwardly extending direction from said cage.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a perspective view of the present invention in operative association with a small animal cage;

FIG. 2 is an enlarged sectional view taken on line 2—2, FIG. 1, depicting the interaction of the ratchet member and locking member;

FIG. 3 is an angular bottom view of the cage apron locking member before assembly with the adjacent ratchet members shown in fragmentary at its installed angle;

FIG. 4 is a view similar to FIG. 3 with the locking member and fragmentary ratchet members in assembled position;

FIG. 5 is an enlarged fragmentary view of the area encircled in FIG. 4;

FIG. 6 is a sectional view similar to FIG. 2, depicting the disassembly of the ratchet member and locking member;

FIG. 7 is a perspective view of the ratchet member and cage prior to breaking the ratchet member to fit the cage shown;

FIG. 8 is a top plan view of the cage apron mounted on a different style cage;

FIG. 9 is an enlarged fragmentary perspective view of the cage apron as shown in FIG. 8;

FIG. 10 is an exploded perspective view of a second embodiment of the present invention;

FIG. 11 is a fragmentary bottom plan view of the ratchet member of the second embodiment of FIG. 10; and FIG. 12 is a top plan view of a splice member of the present invention.

Similar numerals refer to similar parts throughout the drawings.

DESCRIPTION OF THE PREFERRED EMBODIMENTS

The cage apron of the present invention is designated generally at 10, and is shown particularly in FIG. 1 mounted on an animal cage 12. Cage 12 is of the type having a top 14 and a bottom 16. Interposed between top 14 and bottom 16 are bars 18 made of any convenient material, but preferably metal. In this manner, bars 18 form the walls 19 of cage 12. Moreover, bottom 16 may or may not present an exterior ledge 20, depending on the design of the particular cage 12. Cage apron 10 is adapted to fit around cage 12 and is assembled from a plurality of ratchet members 30 and a plurality of locking members 32. In the preferred embodiment of FIGS. 1-9, ratchet members 30 will be straight sections of plastic material and locking members 32 will be right angled corners. When assembled, cage apron 12 defines a rectangular interior perimeter which is complementary to the exterior perimeter of cage 12 so that it fits snugly therearound when mounted on ledge 20.

As shown in FIG. 2, cage apron 10 extends radially outward and upward from the exterior of cage 12 so that most all debris which passes through bars 18 will contact cage apron 10 and be redirected back into the cage. As should be apparent to one skilled in the art, the angular orientation of apron 10 with respect to cage 12, may vary without departing from the spirit of the present invention. However, 45 degrees from the horizontal is preferred as it will extend radially outward a sufficient distance to catch substantially all of the debris, while simultaneously providing a sufficient downward slope thereby allowing the debris to be directed back into the cage.

Referring to FIGS. 1-7, each ratchet member 30 preferably is molded of plastic and has a substantially flat deflecting surface 36 which terminates in a bottom support edge 40 and a top flanged edge 51. A plurality of equally spaced support tangs 46 are formed integrally with and extend outwardly from support edge 40. Flanged edge 51 provides a retroflex curve 48 terminating in an extended edge 54 provided with a plurality of equally spaced crenations 56 extending therefrom separated by a plurality of crenatures 58. A plurality of equally spaced serrations or grooves 59 extend transversely across deflecting surface 36 so that the material at those locations is thinner, thereby defining a predetermined fracture point.

Each locking member 32 also is molded of plastic, and in the preferred embodiment of FIGS. 1-9 has a right angled, corner configuration. Member 32 includes a smooth flat, deflecting surfaces 37 with a parallel inner surface 63, terminating in a bottom support edge 39 and a flanged edge 60 having a retroflex curve 62, complementary to retroflex curve 48 of ratchet member 30. Retroflex curve 62 of locking member 32 presents a slightly wider radius of curvature than does retroflex curve 48 so as to assure that the inner surface 63 of locking member 32 and the deflecting surface 36 of member 30 will be complementary when these two members are telescopically engaged as discussed below, and as shown in FIGS. 2 and 6. Moreover, locking flange 60 extends outwardly a greater distance than does the extended edge 54 of ratchet flange 51.

A plurality of equally spaced apertures 64 are formed in locking flange 60 to provide material for the creation of locking tabs 66, which are also equally spaced and extend outwardly from the interior surface of locking flange 60. Tabs 66 extend outwardly a distance at least equal to the width of extended edge 54 of ratchet member 30 to assure a solid frictional engagement with crenations 56 thereof. Moreover, locking tabs 66 are substantially equal to the width of crenatures 58 such that a first edge 68 (FIG. 5) of locking tabs 66 contacts one crenation, and a second edge 70 of locking tabs 66 contacts another. In this manner, locking tabs 66 are substantially complementary to and align with crenatures 58 which are interposed between crenations 56.

Having now described the two main components of the invention, the assembly thereof is set forth below. Referring to FIG. 3, there is shown three members of apron 10. Locking member 32 is a corner piece having a right angle, four of which will be utilized to form an apron for a square or rectangular cage as shown in FIGS. 1 and 8. However, it is recognized that for cages having corners which are not substantially equal to 90 degrees, for example, a five, six, or seven sided cage, the angle presented by member 32 would be altered to the required angle.

To assemble apron 10, four ratchet members 30 will be telescopically engaged with four locking member 32 as shown in FIG. 4. Specifically, two ratchet members 30 are forced into telescopic engagement with the two ends of each locking member 32 by applying pressure along the direction depicted by arrow A causing the crenations 56 and locking tabs 66 to engage. As ratchet member 30 is engaged with locking member 32, second edge 70 of locking tabs 66 will cam over crenations 56 thereby causing first edge 68 of lock tabs 66 to cam down the crenation causing locking tab 66 to lie within crenature 58. This process will be repeated throughout the series of locking tabs 66 formed into locking flange 60 thereby creating a ratcheting system. Moreover, at each area where ratchet member 30 and locking member 32 are telescopically engaged, the two members will be ratcheted together until the apron 10 fits snugly around cage 12 and is circumambient thereto.

If cage 12 provides an exterior ledge 20, the support tangs 46 of ratchet member 30 must be removed to allow support edge 40 to remain recumbent on exterior ledge 20 (FIG. 2). Support tangs 46 preferably will be molded integrally on member 30 for use when the cage does not have a supporting peripheral ledge as described below, and will be removed easily by breaking them away from bottom edge 40 when used with a cage with a support ledge as shown in FIG. 1.

Having now described the assembly of the present invention in greater detail, the disassembly of the invention will be considered. Referring specifically to FIG. 2, members 30 and 32 are shown telescopically engaged as when mounted on cage ledge 20. Specifically, retroflex curve 48 of ratchet member 30 and retroflex curve 62 of locking member 32 are complementary related. Crenations 56 restrict the movement of locking tabs 66. Restricting disengagement in the transverse direction is the frictional engagement between the complementary related retroflex curves 48 and 62. Specifically, edge 54 of flange 52 is abutted against locking tabs 66 thereby precluding movement of flange 52 downward. Retroflex curve 48 is forced into compressive relation with retroflex curve 62 thereby causing frictional engagement between the outer deflecting surface 36 of ratchet member 30 and the inner surface 63 of locking member 32. This frictional engagement, coupled with the locking interaction of edge 54 and locking tabs 66, provides a solid lock once apron 10 is mounted upon a cage ledge 20.

Upon disengagement, the supporting edge 40 of ratchet member 30 is grasped and pulled in the direction depicted by arrow B in FIG. 6. In this manner, the frictional engagement of the complementary related retroflex curves 48 and 62 is overcome and curve 48 will slide down the inner surface 63 of locking member 32 thereby disengaging the locked connection between crenations 56 and locking tabs 66. While members 30 and 32 could easily be disengaged by sliding ratchet member 30 outward in much the same way as it was engaged, the present method of disassembly will substantially lengthen the life of the present invention as virtually no wear occurs on either the crenations 56 or the locking tabs 66 during the disassembly process.

As was mentioned hereinabove, the present invention may be employed with a variety of cage sizes. As such, it is necessary to provide members whose length may be altered to fit the particular cage for which the cage apron 10 is purchased. Referring then to FIG. 7, there is shown a substantially square cage with one of the ratchet member 30 along its side. Before assembly, the user will take the ratchet member and remove the excess length of material by breaking it along one of the serrations 59. Serrations 59 occur frequently enough that regardless of the size of the cage, a serration will exist which will permit ratchet member 30 to equal substantially the length of that side of cage 10. So long as each end of ratchet member 30 extends to within approximately three inches of the side of the cage, assembly will be possible as sufficient material will exist to allow the ratcheting interaction of crenations 56 and locking tabs 66. However, more material may be allowed such that the unit extends the exact length of the cage. In this situation, a longer portion of ratchet member 30 will telescopically engage with locking member 32. As such, great flexibility is provided in that a single cage apron may be purchased to fit a wide variety of cages. Moreover, the user is not required to cut and measure member 30 exactly as the telescopic interaction between ratchet member 30 and locking member 32 provides a wide margin for error.

Referring then to FIGS. 8 and 9, there is depicted a second embodiment of the present invention wherein cage 10 has no exterior ledge 20. As a result, cage apron 10 cannot be supported by ledge 20 and another means of support is employed. In the first embodiment, the support tangs 46 were removed to allow support edge 40 to remain recumbent on exterior ledge 20. However, in the present embodiment, as there is no exterior ledge 20, support tangs 46 are employed to support the cage apron 10. Specifically, when the plurality of ratchet members 30 and locking members 32 are telescopically engaged to create a snugly fit apron 10, support tangs 46 will extend through bars 18 as specifically shown in FIG. 8. Once apron 10 is released by the user, support tangs 46 will rest upon the edge of the bottom 16 of cage 12 as shown particularly in FIG. 9. In this manner, the present invention may be used both with a cage presenting an exterior ledge as shown particularly in the first embodiment, as well as with a small animal cage presenting no exterior ledge, but simply a bottom tray, as shown in FIGS. 8-9.

Referring then to FIGS. 10 and 11, there is shown another embodiment of the present invention wherein the apron is intended for use with a circular cage. It is apparent to one skilled in the art that a cage of oval or any nonlinear shape could employ the present invention.

Referring specifically then to FIGS. 10 and 11, there is shown a ratchet member indicated generally at 74 having a plurality of equally spaced slots 76 milled across the deflecting surface 75 in a direction transverse to the longitudinal axis of the member. Aside from this alteration, ratchet member 74 does not differ materially from that of ratchet member 30 employed in the previous two embodiments. Slots 76 are employed to allow block portions 78 thereof to overlap to the extent necessary to provide a curve along the interior perimeter which is complementary related to the curved exterior of a nonlinear cage on which apron 10 is adapted to be mounted. As each block member 78 travels through slots 76 and across a neighboring block member, flange portion 51 acts as a living hinge allowing the block portions to flex with respect to each other. Similarly, a locking member 82 (FIG. 12) is modified in much the same way as ratchet member 74 to provide a member which is similar to locking member 32 which is telescopically engaged and ratcheted into the opposed ends of ratchet member 74 for forming the circular apron configuration for mounting on a circular cage. Tab 46 also may be formed on ratchet member 74 and used with a circular cage without a support ledge.

Referring to FIG. 12, there is shown a splice member 84 which may be employed in any of the above three embodiments. Splice member 84 presents the same configuration as either locking member 32 or 82 but has a linear configuration such that it may be employed to joint two full length ratchet members in the event that a single ratchet member does not provide the length necessary to span a given dimension of a cage. In this manner, cages that are longer than the standard ratchet unit provided may still be fitted with the apron 10 of the present invention.

Accordingly, the cage apron of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cage apron is constructed and used, the characteristics of the construction, and the advantageous, new and useful results obtained; the new and useful structures, devices, elements, arrangements, parts and combinations, are set forth in the appended claims.

I claim:

1. A cage apron adapted for use with a wire pet cage, for redirecting debris scattered from the cage by an enclosed animal, said cage apron comprising:

at least one locking member having spaced locking tabs extending along a portion of the length thereof; and at least one ratchet member having spaced crenations extending along a portion of the length thereof adapted to engage said locking tabs when said ratchet member is telescopically ratcheted along said locking member to form a circumambient apron adapted to be supported from said cage in an outwardly extending direction from said cage.

2. A cage apron as defined in claim 1 adapted for use with a cage having an outer ledge in which the ratchet member has a linear support edge and an opposite flanged edge; in which the locking member has a linear support edge and an opposite flanged edge; and in which at least one of said support edges is adapted to be supported from said outer ledge of the cage.

3. A cage apron as defined in claim 1 in which the ratchet member has a linear support edge and an opposite flanged edge; in which the locking member has a support edge and an opposite flanged edge; in which a plurality of support tangs extend from one of said support edges and are adapted to extend through said cage wires when said ratchet member and said locking member are telescopically engaged to support said apron on said cage.

4. A cage apron as defined in claim 2 in which a deflecting surface extends between the flanged edge and the support edge of the ratchet member and of the locking member and are adapted to extend outwardly and upwardly from the cage; in which the flanged edges extend in a retroflex fashion from said deflecting surfaces; in which the crenations extend outwardly from the flanged edge of said ratchet member; in which a locking flange extends away, in a retroflex fashion from the deflecting surface of the locking member; and in which the locking tabs extend from an interior surface of said locking flange for ratcheting over said crenations of said ratchet member for joining said two members together.

5. A cage apron as defined in claim 4 wherein the crenations are spaced equally from one another; and in which the locking tabs are spaced evenly apart along the interior surface of the locking flange of the locking member.

6. A cage apron as defined in claim 1 in which the locking member and ratchet member are formed of plastic.

7. The cage apron defined in claim 1 in which the ratchet member is formed with a plurality of spaced serrations to provide areas of reduced thickness to facilitate separation of the ratchet member into portions whereby one of said portions is substantially equal in length to one side of the cage.

8. The cage apron defined in claim 1 in which the apron has a rectangular configuration comprised four locking members and four ratchet members; and in which the locking members each have a generally right angled configuration and form the corners of the rectangle.

9. The cage apron defined in claim 1 in which the ratchet member is formed with a plurality of spaced slots to enable said ratchet member to be formed into a generally circular configuration terminating in a pair of opposed ends; and in which the locking member extends between said opposed ends of the ratchet member for joining said ratchet member into the circular configuration.

10. The cage apron defined in claim 9 in which the locking member is formed with at least one slot enabling said locking member to assume an arcuate configuration.

11. The cage apron defined in claim 4 in which the deflecting surfaces of the locking member and of the ratchet member lie in juxtaposition when telescopically ratcheted together.

12. The cage apron defined in claim 4 in which the flanged edges of the ratchet member and locking member lie in juxtaposition when said members are telescopically ratcheted together.

13. The cage apron defined in claim 1 in which the ratchet member is linear and the locking member is right angled.

14. In combination, a pet cage having a bottom, and sides formed by generally evenly spaced wires, and an apron mounted on said cage for redirecting debris knocked from the cage back into said cage, said apron comprising:
at least one locking member having a plurality spaced locking tabs extending generally the length thereof;
at least one ratchet member, having a plurality of spaced crenations extending generally the length thereof, said crenations being engaged with the locking tabs to telescopically join said locking member and said ratchet member to form a circumambient apron around said cage; and
means for supporting the apron on said cage.

15. The combination defined in claim 14 in which the ratchet member has a support edge and an opposite flanged edge; in which the locking member has a support edge and an opposite flanged edge; and in which at least one of said support edges is supported from an outer ledge of said cage.

16. The combination defined in claim 15 in which the cage has a plurality of corners; and in which the locking members are angled to complement the angle of the corners of the cage.

17. The combination defined in claim 14 in which the cage is annular; in which the ratchet member is formed with a plurality of spaced slots extending transversely across the member with respect to a longitudinal axis of said member, allowing said ratchet member to be fitted into an annular configuration complementary to the cage; and in which the locking member is formed with at least one slot enabling said locking member to be formed into an arcuate configuration for engagement with a pair of opposed ends of the ratchet member to retain said ratchet member in said annular configuration.

18. The combination defined in claim 15 in which the support edge of one of the members is formed with outwardly extending tabs; and in which said tabs extend between certain pairs of the cage wires for mounting the apron on said cage.

19. The combination defined in claim 15 in which a deflecting surface extends between the flanged edge and the support edge of one of the members and extends at an upwardly outwardly direction from said cage.

* * * * *